Aug. 8, 1944.                J. B. WILKIE                2,355,406
           DEVICE FOR USE AS MICROAMMETERS AND POTENTIOMETERS
                          Filed March 17, 1942
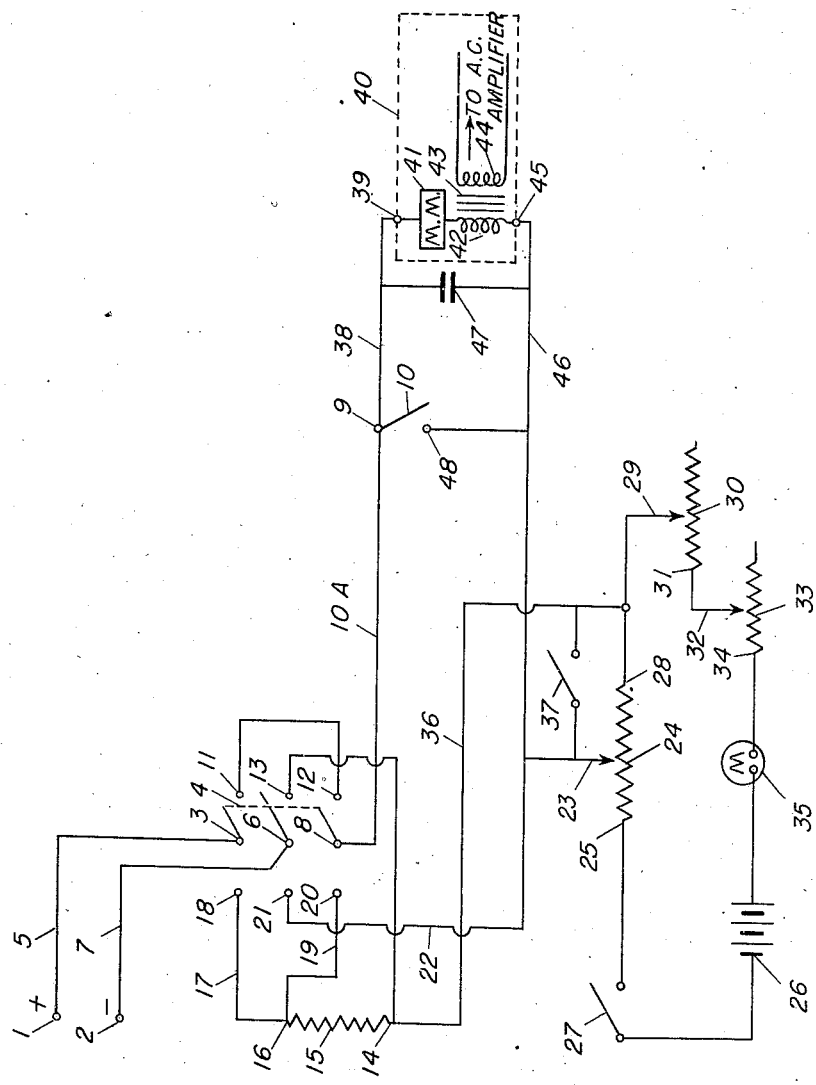
JOHN B. WILKIE    Inventor
By
Albert J. Kramer
           Attorney Patented Aug. 8, 1944

2,355,406

UNITED STATES PATENT OFFICE 2,355,406

DEVICE FOR USE AS MICROAMMETERS AND POTENTIOMETERS

John B. Wilkie, Silver Spring, Md.; dedicated to the free use of the People in the Territory of the United States Application March 17, 1942, Serial No. 435,032

4 Claims. (Cl. 171—95)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to devices for measuring very minute direct currents and potentials.

Many electrochemical and photoelectrical operations require the measurement of both small D. C. potentials and currents. The method usually employed to measure small potentials is by means of either a millivoltmeter or a potentiometer and small currents are generally measured with a galvanometer. Galvanometers of the highest sensitivity are required, for example, in most photometrical work because of the unavoidably low energy value of the available light. However, the most sensitive galvanometers lack stability and are characteristically time consuming.

The general object of this invention is the provision of a device which will accurately measure very minute currents and which will at the same time be sufficiently rugged and stable to fulfill the needs of both modern research and commercial routine measurements.

Another object of this invention is the provision of a combination of electrical elements controlled by a simple switch which can be used to measure minute currents when the switch is in one position and minute potentials when the switch is in another position.

This invention is especially useful in the precision measurement of currents generated by barrier layer photoelectric cells in connection with light transmittancy determinations.

In the accompanying drawing, there is illustrated by means of a wiring diagram a preferred embodiment of my invention. The circuit shown in the diagram has two terminals, namely, a terminal 1, and a terminal 2, for connection to a positive and negative external source of potential or current, respectively, the value of which is to be determined. The terminal 1 is connected to the first pole 3 of a triple pole double throw switch 4 by a conductor 5, and the terminal 2 is connected to the second pole 6 of said switch by a conductor 7. The third pole 8 of the switch is connected to one terminal 9 of a simple switch 10, by a conductor 10A.

One contact 11 of the first pole of the switch 4 is connected to the corresponding contact 12 of the third pole. The corresponding contact 13 of the second pole is connected to one end 14 of a fixed resistor 15. The other end 16 of the resistor 15 is connected by one conductor 17 to the alternate contact 18 of the first pole of the switch 4 and by another conductor 19 to the corresponding alternate contact 20 of the third pole of the said switch 4. The remaining alternate contact 21 of the switch 4 is connected by a conductor 22 to the contact slider 23 of a slide-wire resistor 24. The resistor itself has one end 25 connected to the positive pole of a battery 26 through a switch 27. The other end 28 of the resistor 24 is connected to the variable terminal 29 of a variable resistor 30. The fixed terminal 31 of said resistor 30 is connected to the variable terminal 32 of vernier resistor 33, and the fixed terminal 34 of the resistor 33 is connected to one terminal of a meter 35, such as a milliammeter, the other terminal of the meter being connected to the negative pole of the battery 26.

The negative side 28 of the resistor 24 is connected to the resistor 15 at the end 14 by a conductor 36. A shorting switch 37 is connected across the conductors 36 and 22. The terminal 9 of the switch 10 is connected by a conductor 38 to one terminal 39 of a null indicator designated generally by the numeral 40, which may be any suitable instrument such as a galvanometer, ear phones, electrometer, or any other device which can detect an electrical current. A preferred and novel type of null indicator is illustrated in the diagram and it comprises a magnetic modulator 41 in series with the primary winding 42 of a transformer 43. If desired, a commutator or interruptor may be used in place of the magnetic modulator. The secondary winding 44 of the transformer is connected to feed a suitable A. C. amplifier (not shown) of any desired type including, as usual, some form of current indicating means, to furnish as much amplification of the modulation as may be desired or necessary. The other terminal 45 of the null indicator 40 is connected by a conductor 46 to the contact slider 23. Across the conductors 38 and 46 a by-pass condenser 47 for eliminating incidental electrical disturbances is connected, and the other terminal 48 of the switch 10 is connected to the conductor 46 on the side of the condenser 47 opposite the null indicator 40.

When the switch 27 is closed, current from the battery 26 flows through the meter 35, resistors 33, 30, and 24. A voltage drop is produced across the terminals 25 and 28 which varies from zero at the end 28 to the maximum drop at the other end 25, which is used for balancing purposes by means of the contact slider 23. The resistors 30 and 33 are used when it is desired to change the range of voltage drop across the terminals 28 and 25. When it is desired to obtain a zero potential without disturbing a previous setting of the slider 23, the shorting switch 37 may be closed.

If the switch 4 is closed to the right, so that the poles 3, 6, and 8 are connected with the contacts 11, 13, and 12, respectively, a closed connection is established from the slider 23 to the null indicator 40 through the conductor 46. Also a closed connection is established between the negative terminal 28 of the resistor 24 and the terminal 2 through conductor 36, switch contact 13, pole 6, and the conductor 7. Further, a closed connection is established between the other terminal 1 and the terminal 39 of the null indicator 40 through conductor 5, switch pole 3, contacts 11 and 12, pole 8, and conductors 10A and 38.

To measure an unknown potential, a reference source of E. M. F., such, for example, as a conventional standard cell is first placed across the terminals 1 and 2, and the resistors 30 and 33 are adjusted so that the meter 35 indicates that a current is flowing through the battery circuit of a convenient arbitrary magnitude. For convenience, to avoid calculations, it is preferred that the adjustment be made such that the current flowing through the battery circuit in amperes, milliamperes, or some other unit, is numerically equal to the E. M. F., or other unit corresponding to E. M. F., of the reference source. The slider 23 is then adjusted to a point where the indicator 40 indicates that no current is flowing through it, that is, to the null point. Then the reference source is replaced by the unknown potential to be measured and the resistors 30 and 33 readjusted until the null point is again established without disturbing the adjustment of slider 23. Under these conditions the meter 35 will give an index of the value of the unknown potential in terms of the unit of the reference source. If the adjustment made against the reference source is in the manner preferred as indicated above, the numeral value of the meter reading is also the numerical value of the unknown potential in units corresponding to the E. M. F. and no subsequent calculations are necessary. The units corresponding to the E. M. F. may be volts, light intensity, or those used in connection with photoelectric photometry, radiometry, thermometry, and so forth. In this manner, the invention is employed as a typical potentiometer.

To use the device as a microammeter, that is a device for measuring small current values, the switch 4 is thrown to the left so that the poles 3, 6, and 8 are connected to contacts 18, 21, and 20, respectively. In this position, the negative terminal 28 of the resistor 24 is connected by one series of connections to the terminal 39 of the null indicator 40, through conductor 36, resistor 15, switch contact 20, pole 8, conductor 10A, and conductor 38; and by another series of connections to the terminal 1 through conductor 36, resistor 15, conductor 17, switch contact 18, pole 3, and conductor 5. Further, the slider 23 is connected by one series of connections to the other terminal 2, through conductor 22, switch contact 21, pole 6, and conductor 7, and by another series of connections to the other terminal 45 of the null indicator 40, through conductor 46 and conductor 22. This places the terminals 1 and 2 in series with the resistor 15, and that portion of the resistor 26 between the negative terminal 28 and slider 23, the null indicator 40 being across the circuit between the terminals 1 and 2 and the remaining portion of the source circuit.

The instrument is first standardized against a reference source of current, which source is connected across the terminals 1 and 2. In standardizing the instrument, the resistors 30 and 33 are adjusted so that the current of the battery circuit is of a convenient arbitrary magnitude indicated by the meter 35 when the slider 23 is adjusted to the null point. The reference source is then replaced by the unknown current to be measured and the resistors 30 and 33 readjusted to the null point. Any change in the setting of resistors 30 and 33 causes a corresponding change in the current flowing through the battery circuit, which is indicated by the meter 35 and is an index of the unknown current relative to the reference current since the current across the null indicator is directly proportional to the current in the battery circuit for any given setting of the slider 23.

For determining currents up to 60 microamperes and voltages up to 1,000 millivolts, the following values of the electric elements shown in the drawing may be used:

Fixed resistor 15 _____ 10,000 ohms
Resistor 24 _____ 1,000 ohms
Resistor 33 _____ 200,000 ohms
Meter 35 ___ 0–1 milliammeter resistance of 200 ohms
Battery 26 _____ Standard 1.5 volt dry cell
Null indicator 40 ___ Galvanometer of 0.0012 microampere per millimeter, period 5.1 seconds (any electronic null indicator may be used instead)
Condenser 47 _____ 0.004 mfd.

Having thus described my invention, I claim:

1. A device of the character described comprising a current meter, a source of direct current, a variable resistor and a slide wire resistor electrically connected in series relation, arranged so that one end of said slide wire resistor is of a negative polarity with respect to the other end, a contact slider for said slide wire resistor, a null indicator, and a triple pole double throw switch, one pole of said switch being for electrical connection to the positive side of an external unknown source of electricity to be measured, the second pole being for electrical connection to the negative side of said external source, and the third pole being electrically connected to one pole of said null indicator, one contact of said first pole being electrically connected to the corresponding contact of the third pole, the corresponding contact of said second pole being electrically connected to the negative end of said slide wire resistor, a fixed resistor, the alternate contact of the first pole being electrically connected to one end of said fixed resistor and to the corresponding alternate contact of said third pole, the corresponding alternate contact of said second pole being electrically connected to said contact slider and to the other terminal of said null indicator, the other end of said fixed resistor being electrically connected to the negative side of said slide wire resistor.

2. A device of the character described comprising a current meter, a source of direct current, a variable resistor and a slide wire resistor electrically connected in series relation, arranged so that one end of said slide wire resistor is of a negative polarity with respect to the other end, a contact slider for said slide wire resistor, a null indicator, and a triple pole double throw switch, one pole of said switch being for electrical connection to the positive side of an external unknown source of electricity to be measured, the second pole being for electrical connection to the negative side of said external source, and the third pole being electrically connected to one pole of said null indicator, one contact of said first pole being electrically connected to the corresponding contact of the third pole, the corresponding contact of said second pole being electrically connected to the negative end of said slide wire resistor, a fixed resistor, the alternate contact of the first pole being electrically connected to one end of said fixed resistor and to the corresponding alternate contact of said third pole, the corresponding alternate contact of said second pole being electrically connected to said contact slider and to the other terminal of said null indicator, the other end of said fixed resistor being electrically connected to the negative side of said slide wire resistor, and a condenser electrically connected across the terminals of said null indicator to eliminate from said null indicator incidental electrical disturbances.

3. A device as defined by claim 1 in which the null indicator comprises an interruptor, a transformer having a primary and secondary winding, and an A. C. amplifier, said interruptor being electrically connected in series relation with the primary winding of said transformer and said amplifier being electrically connected in series relation with the secondary winding of said transformer.

4. A device for measuring electrical currents comprising a source of direct current, a current meter, a variable resistor electrically connected and a slide wire resistor in series relation, arranged so that one end of said slide wire resistor is of a negative polarity with respect to the other end, a contact slider for said slide wire resistor electrically connected to a terminal for one pole of an external unknown source of electricity to be measured, and one end of said slide wire resistor being electrically connected to another terminal for the other pole of said external source, a fixed resistor electrically connected in series relation with said terminals, and a null indicator in the circuit shunted across said terminals.

JOHN B. WILKIE.